(12) United States Patent
Sayadi et al.

(10) Patent No.: US 8,537,749 B2
(45) Date of Patent: Sep. 17, 2013

(54) METHOD OF TRANSMITTING DATA FROM AN INFRASTRUCTURE OF A RADIO-COMMUNICATION NETWORK TO USER EQUIPMENT, AND EQUIPMENT FOR IMPLEMENTING THE METHOD

(75) Inventors: Bessem Sayadi, Nozay (FR); Marie Line Alberi-Morel, Nozay (FR); Sylvaine Kerboeuf, Nozay (FR); Laurent Roullet, Nozay (FR)

(73) Assignee: Alcatel Lucent, Paris (FR)

( * ) Notice: Subject to any disclaimer, the term of this patent is extended or adjusted under 35 U.S.C. 154(b) by 457 days.

(21) Appl. No.: 12/678,369

(22) PCT Filed: Jul. 24, 2008

(86) PCT No.: PCT/EP2008/059754
§ 371 (c)(1),
(2), (4) Date: Jul. 6, 2010

(87) PCT Pub. No.: WO2009/037038
PCT Pub. Date: Mar. 26, 2009

(65) Prior Publication Data
US 2010/0287593 A1   Nov. 11, 2010

(30) Foreign Application Priority Data

Sep. 21, 2007   (FR) ...................................... 07 57748

(51) Int. Cl.
*H04W 4/00* (2009.01)
(52) U.S. Cl.
USPC ........... 370/328; 375/316; 375/340; 375/341; 725/62

(58) Field of Classification Search
USPC .................... 370/310–350; 375/340.01, 340, 375/341; 725/62
See application file for complete search history.

(56) References Cited

U.S. PATENT DOCUMENTS

| | | | |
|---|---|---|---|
| 6,553,538 B2* | 4/2003 | Zehavi | 714/784 |
| 2007/0070892 A1* | 3/2007 | Lee et al. | 370/229 |
| 2007/0247936 A1* | 10/2007 | Direnzo et al. | 365/200 |
| 2007/0291836 A1* | 12/2007 | Shi et al. | 375/240.01 |

FOREIGN PATENT DOCUMENTS

| | | |
|---|---|---|
| EP | 1 580 917 A | 9/2005 |
| EP | 1 708 404 A | 10/2006 |
| WO | WO 2007/060589 A | 5/2007 |

OTHER PUBLICATIONS

International Search Report, Publication Date: Mar. 26, 2009.

* cited by examiner

*Primary Examiner* — Charles C Jiang
(74) *Attorney, Agent, or Firm* — Fay Sharpe LLP

(57) ABSTRACT

Within a user device to which a radio communication network infrastructure transmits data carried by a sequence of frames broadcast to the user device, each frame comprising a first section comprising data and a second section comprising redundancy information associated with the data of a predetermined number B of previous frames in the sequence, a number of consecutive lost frames is compared to a threshold dependent on the number B of previous frames with which said redundancy information is associated and encoding parameters that generate said redundancy information, and a request to retransmit at least one of the consecutive lost frames is sent to the radio communication network infrastructure if the number of consecutive lost frames exceeds said threshold.

12 Claims, 5 Drawing Sheets

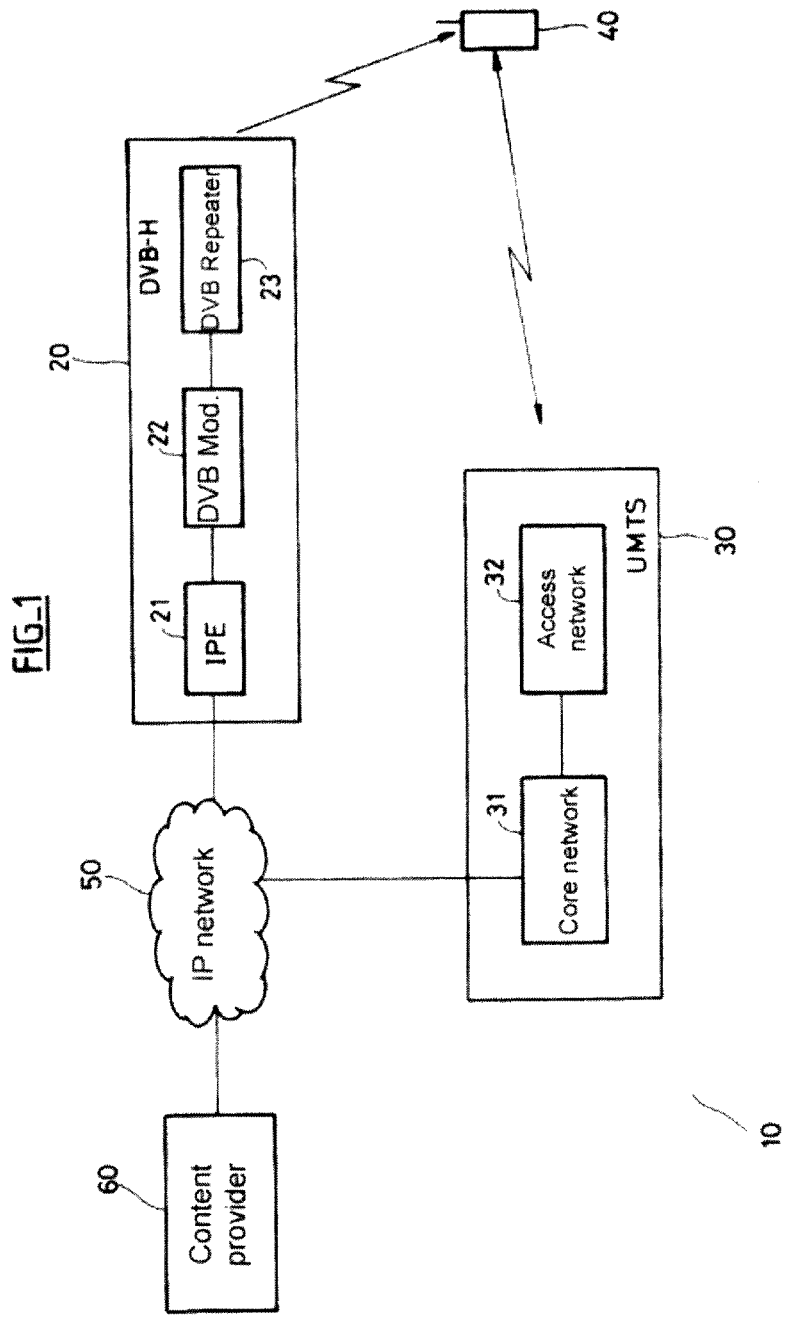

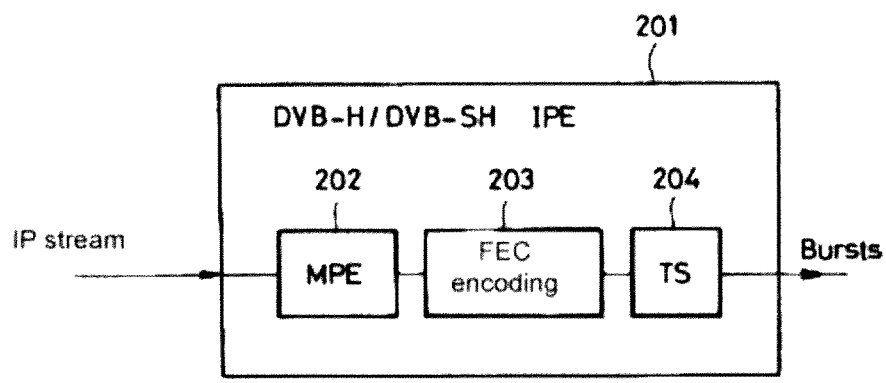
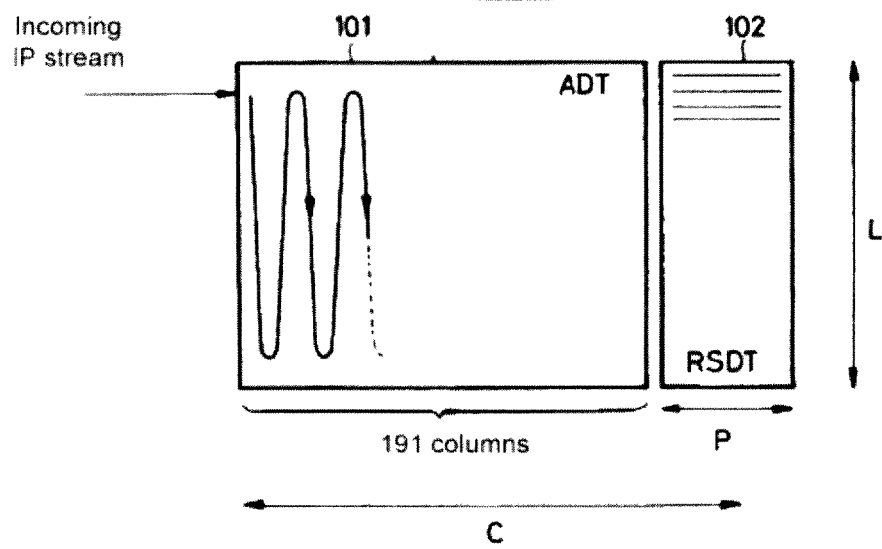

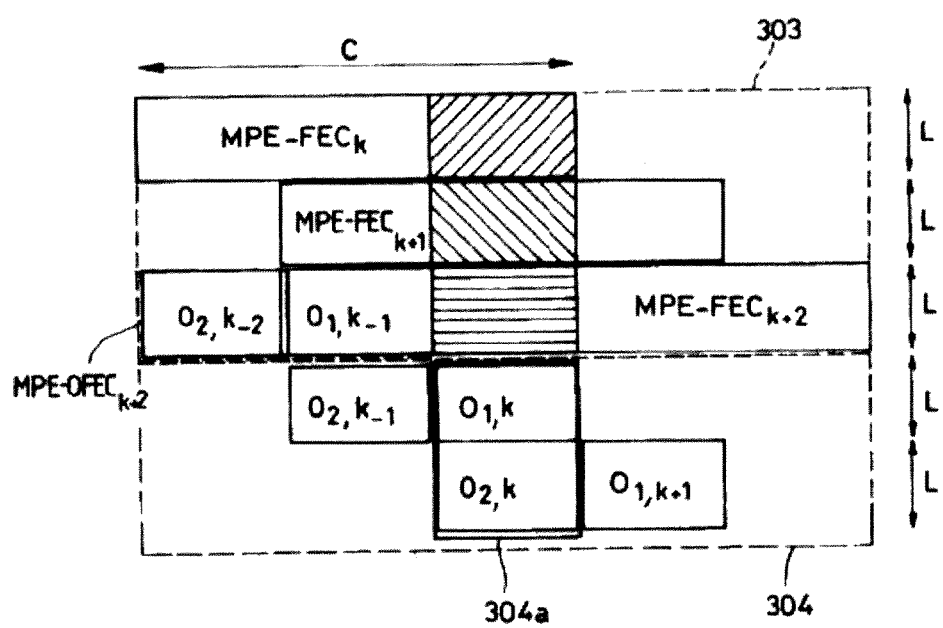
FIG_4

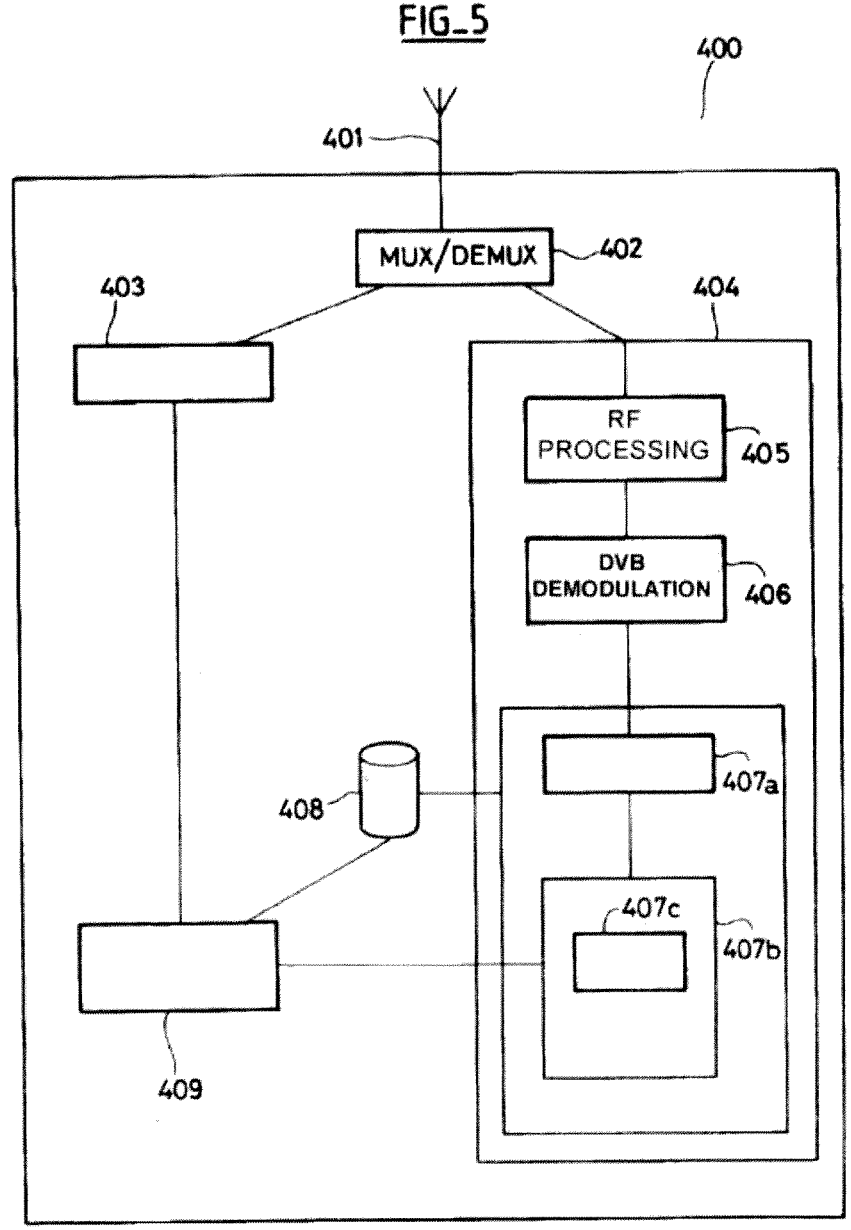

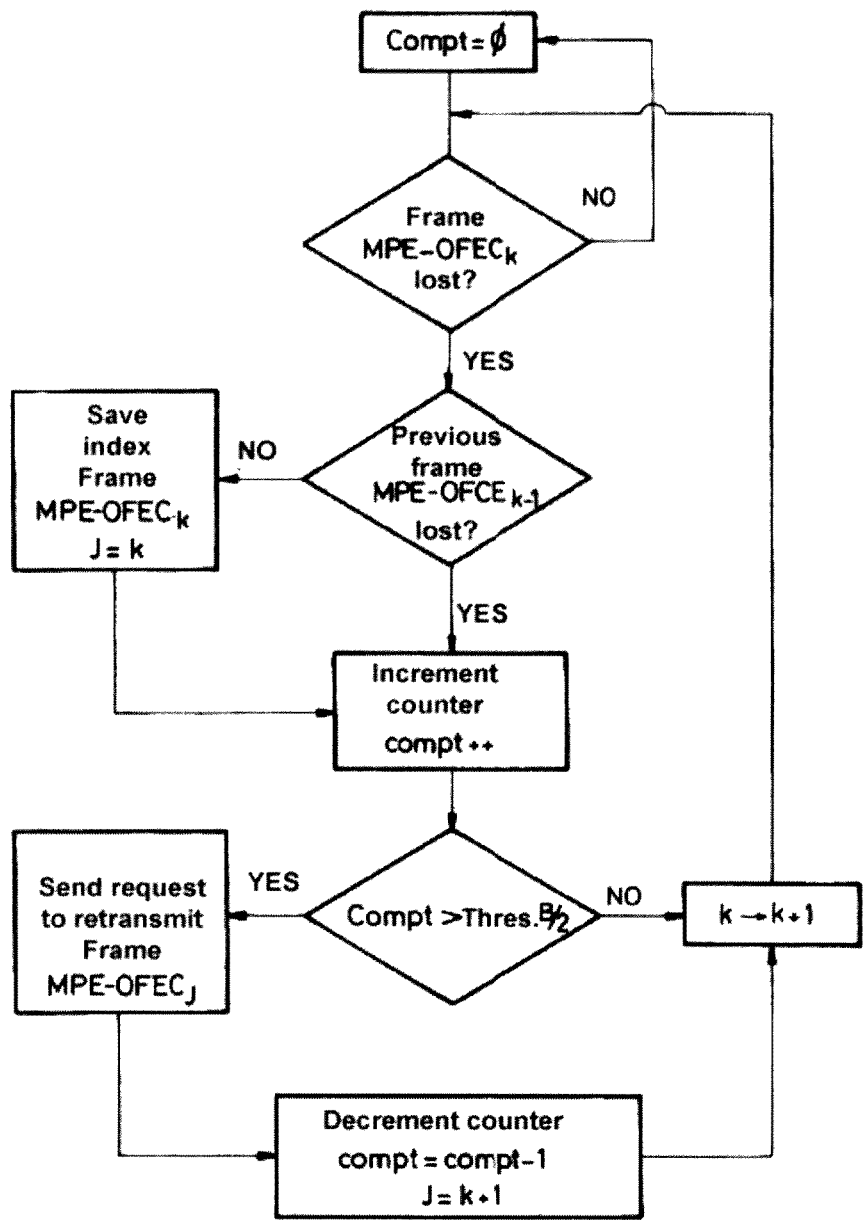
FIG_6

METHOD OF TRANSMITTING DATA FROM AN INFRASTRUCTURE OF A RADIO-COMMUNICATION NETWORK TO USER EQUIPMENT, AND EQUIPMENT FOR IMPLEMENTING THE METHOD

The invention pertains to a method for transmitting data from an infrastructure of a radio communication network to user devices, as well as devices for implementing the method.

It may advantageously apply in the context of broadcasting multimedia content, such as video, to user devices. DVB ("Digital Video Broadcasting") systems, standardized by the ETSI, are examples of such broadcast systems. DVB-H and DVB-SH systems, currently in the process of specification, will complement the features of the terrestrial broadcasting system DVB-T by offering the ability to broadcast multimedia content to mobile terminals. The DVB-T and DVB-H systems are described in the documents ETSI TR 101,190 v1.2.1, entitled "Digital Video Broadcasting (DVB); Implementation guidelines for DVB terrestrial services; Transmission aspects", published by the ETSI in November 2004, and ETSI EN 302,304 v1.1.1, entitled "Digital Video Broadcasting (DVB); Transmission System for Handheld Terminals (DVB-H)", published by the ETSI in November 2004, respectively, to which one may refer.

Within the scope of transmitting multimedia content to mobiles, offering a satisfactory quality of service perceived by the user (a satisfactory visual quality, a low service interruption rate) remains the primary difficulty for broadcast service operators. The phenomena of fading, which every signal transmitted over an air-interface propagation channel undergoes, causes a degradation in the quality of the received signal, which the channel-encoding techniques commonly employed into digital radio communication systems are somewhat able to protect against.

The channel-encoding techniques conventionally comprise one or more steps of encoding in order to protect the data to be transmitted from transmission errors, and one or more steps of interlacing the encoded feeds so as to ensure that a transmission error assigns symbols distributed across a given set instead of assigning an adjacent group of symbols. The encoding is done using an error-correction code (known as FEC, for "Forward Error Protection"), such as a Reed-Solomon code or any other block-encoding technique.

Reed-Solomon codes are an example of block codes used for error-correction coding in data transmission systems. Block codes are characterized by the fact that the error-correction code is calculated fora block, segment, or frame of data of a predetermined length. A Reed-Solomon code is commonly designated by a pair of parameters (n,k) in which n corresponds to the size in symbols (a simple typically being a byte of 8 bits) in the codeword, and k corresponds to the size of the data block to be encoded, so that a codeword whose size is n symbols corresponds to k data symbols and n–k redundancy symbols (also known as parity symbols). The ratio k/n corresponds to the Reed-Solomon code's encoding rate. The maximum number of symbol errors which may be corrected by a Reed-Solomon code (n,k) is given by the ratio (n–k)/2. The maximum number of dropped symbols which may be corrected by a Reed-Solomon code (n,k) is equal to n–k. For example, for a sequence of 100 bytes to which 10 redundancy bytes are added, the Reed-Solomon code may recover up to 10 lost bytes (lost owing, for example, to the fading phenomena mentioned above). The symbol loss correction capacity is measured by the ratio 1/(n–k).

Whenever the losses of data or errors observed in the received data exceeds the correction capacity of the error-correction codes that are used, lost or incorrect data may be retransmitted, for example as part of automatic repeat request (ARQ) procedures for data transmission systems that use acknowledgment mechanisms.

Since current broadcast systems do not by nature offer any uplink communication channel, known as a "back channel", from the receiving terminal to the broadcast infrastructure, or a back channel whose bit rate is too low to be used to send data retransmission requests which prove effective, systems are currently conceived which join together a broadcast infrastructure and a cellular radio communication network infrastructure, so as to enjoy the bit rates that are offered, particularly over the uplink channel, between a mobile station and a cellular radio communication network infrastructure.

The document US 2006128422 describes a method for interoperation between a cellular system and a broadcast system based on the quality of service observed by the mobile station. The mobile station negotiates a quality of service with a service provider which controls the provisioning of multimedia content. The service provider decides to provide multimedia content to the mobile station by means of the cellular system or that of the broadcast system.

The document entitled "A satellite based multicast layer architecture for mobile networks to provide efficient spectrum usage of IMT2000 bands" published by Alcatel in January 2002 (and available at the URL cordis.europa.eu/ist/ka4/mobile/password/02/20_aspi_ecc_pt1_35.pdf) proposes using a cellular network for retransmitting the lost portions of multimedia content feeds broadcast by a S-DMB (Satellite Digital Multimedia Broadcasting) system. This procedure is based on the protocol entitled "Flute", and does not take into account the real-time constraints imposed by providing a multimedia stream to a mobile terminal. However, these constraints do occur when implementing an effective error-correction method which optimizes the user's experience while increasing the perceived quality of service One main goal of the invention is to provide a solution which is more effective in that respect.

The invention thereby proposes a method for transmitting data from a radio communication network infrastructure to user devices, said data being carried by a sequence of frames broadcast to the user devices, each frame comprising a first section comprising data and a second section comprising redundancy information associated with the data of a predetermined number B of previous frames in the sequence. The method comprises the following steps, relative to a user device:

/a/ comparing a number of consecutive lost frames to a threshold dependent on the number B of previous frames with which said redundancy information is associated and encoding parameters generating said redundancy information;

/b/ sending to the radio communication network infrastructure a request to retransmit at least one of the consecutive lost frames if the number of consecutive lost frames exceeds said threshold.

"Frame" refers to a set of data organized according to a determined format, associated with a mode of transmission.

In one particular embodiment of the invention, the threshold depends on B and on the coding rate of the encoding that generates said redundancy information. It may, for example, be chosen to be equal to:

$$B \times \frac{1-T}{T},$$

where T refers to the coding rate of the encoding that generates said redundancy information. The encoding that generates the redundancy information may, for example, be a block-encoding of the data of the first sections of B previous frames in the sequence.

Additionally, the transmission request, if the number of consecutive lost frames exceeds the threshold, may be for the first lost frame within the sequence of consecutive lost frames.

In another particular embodiment of the invention, the radio communication network infrastructure comprises a multimedia content broadcast network infrastructure and a cellular radio communication network infrastructure, and the user devices are capable of receiving content broadcast by the multimedia content broadcast network infrastructure and of communicating with the cellular radio communication network infrastructure. The frames carrying the data are broadcast to the user devices by the multimedia content broadcast network infrastructure, and the request to retransmit at least one of the consecutive lost frames is sent to the cellular radio communication network infrastructure. The multimedia content broadcast network infrastructure may be DVB-H or DVB-SH, and the cellular radio communication network infrastructure may be UMTS. LTE or WiMAX.

The invention further proposes a radio communication device, comprising sending and receiving means for communicating with a cellular radio communication network infrastructure transmitting data to user devices, said data being carried by a sequence of frames broadcast to the user devices, each frame comprising a first section comprising data and a second section comprising redundancy information associated with the data of the B previous frames in the sequence. The inventive device further comprises means for receiving and decoding said frames, capable of determining the loss of consecutive frames in the sequence, means for comparing the number of consecutive lost frames in the sequence to a threshold dependent on the number B of previous frames with which said redundancy information is associated, and parameters of the encoding that generated said redundancy information, and means for sending a request to the radio communication network infrastructure to retransmit at least one of the consecutive lost frames if the number of consecutive lost frames exceeds said threshold.

In one particular embodiment of the invention, the comparison means are adapted to compare the number of consecutive lost frames to a threshold dependent on the number B of previous frames with which said redundancy information is associated, and the coding rate of the encoding that generated said redundancy information. They may further be adapted to compare the number of consecutive lost frames to a chosen threshold equal to:

$$B \times \frac{1-T}{T},$$

where T refers to the coding rate of the encoding that generated said redundancy information.

Furthermore, the sending means may be adapted to send a request to the radio communication network infrastructure to retransmit the first lost frame in the sequence of consecutive lost frames if the number of consecutive lost frames exceeds the threshold.

In another particular embodiment of the invention, the means for sending and receiving are capable of receiving multimedia content broadcast by a multimedia content broadcast network infrastructure and of communicating with a cellular radio communication network infrastructure, the means for receiving and decoding the frames are adapted to receive and decode frames carrying data broadcast to the user devices by the multimedia content broadcast network infrastructure, and the means for sending a retransmission request to the radio communication network infrastructure are adapted to send the retransmission request to the cellular radio communication network infrastructure. The multimedia content broadcast network infrastructure may be DVB-H or DVB-SH, and the cellular radio communication network infrastructure may be UMTS. LTE or WiMAX.

This radio communication device according to the invention may advantageously be integrated into a mobile radio communication station.

The invention finally proposes a computer program that may be loaded into a memory associated with a processor, and comprising instructions for implementing a method as defined below when said program is executed by the processor, as well as a data-processing medium on which said program is stored.

Other particularities and advantages of the present invention will become apparent in the description below of non-limiting example embodiments, with reference to the attached drawings, in which:

FIG. 1 shows the architecture of a hybrid multimedia content broadcast system to which the invention may advantageously apply;

FIG. 2 is a synoptic diagram of an IPE node of a DVB broadcast network infrastructure;

FIG. 3 illustrates the application of a first FEC encoding to a sequence of symbols within a DVB broadcast network infrastructure;

FIG. 4 illustrates the application of a second FEC encoding applied to MPE-FEC frames within a DVB broadcast network infrastructure;

FIG. 5 is a synoptic diagram of a user device implementing the present invention according to one particular embodiment;

FIG. 6 schematically depicts an example algorithm for implementing the invention according to one particular embodiment.

The invention is particularly well-suited, though not exclusively so, to a hybrid system comprising a DVB-H or DVB-SH multimedia content broadcast network, and a UMTS cellular radio communication network, and is described below in its application to such a system. Furthermore, in what follows, it is assumed by way of a non-limiting example that the multimedia content broadcast to the user devices are videos. The invention, however, is not limited to this type of content, and in reality relates to any type of multimedia content, and particularly television or radio programs and audio content.

This application is illustrated by FIG. 1, which shows a system 10 that comprises a DVB-H or DVB-SH multimedia content broadcast network 20, and a UMTS cellular radio communication network 30.

The cellular radio communication network 30 comprises a UMTS core network 31, connected to one or more fixed-line networks 50 as well as to a UMTS radio access network 32 (UTRAN), by means of an interface known as Iu. The UTRAN network 32 comprises base stations, known as "Node-B", distributed throughout the UTRAN network's coverage area, and capable of communicating by radio with the user devices 40. It further comprises radio network controller devices, or RNCs, each RNC being connected to one or more base stations by means of an interface known as Iub.

The multimedia content broadcast network 20 comprises an IPE ("IP Encapsulateur") node 21 which transposes an input feed of IP ("Internet Protocol") datagrams transporting the multimedia content in a DVB transport feed using a so-called multiprotocol encapsulation (MPE) process. The DVB transport stream is then transmitted to the DVB-T modulator 22, potentially after having been multiplexed with other DVB service feeds. The DVB-T modulator 22 formats the received signals in order to transmit them over the air interface, potentially by means of the repeater 23, to the user devices 40.

The multimedia content broadcast network 20 and the cellular radio communication network 30 are connected to an IP network 50, by the intermediary of the IPE node 21 and of the core network 31, respectively. The multimedia content broadcast to the user devices is provided by a content-supplying node 60, which itself is also connected to the IP network 50.

The user device 40 is multi-modal in that it is capable of communicating with the broadcast network 20 and with the cellular radio communication network 30. In what follows, by way of a non-limiting example, a UMTS/DVB multi-mode communication terminal is assumed. However, the invention is not limited to this type of user device, and may be applied to any fixed or mobile (or portable or cellular) communication device capable of communicating with a radio communication network infrastructure transmitting data to user devices, said data being carried by a sequence of frames broadcast to the user devices. Consequently, it may be a landline telephone, a desktop or laptop computer, a receiver of layered multimedia content (such as a decoder, a residential gateway, or a set-top box), so long as it is equipped with communication means, which are potentially radio- or satellite-based, capable of communicating with a communication network infrastructure transmitting data to user devices, said data being carried by a sequence of frames broadcast to the user devices.

The transmission channel of the DVB broadcast network 20 comprises elements in layers 1 and 2 of the ISO model. Layer 2 (the data link layer) comprises a step of channel-encoding, which performs FEC ("Forward Error Correction") encoding on the data to be transmitted. This data link layer is, for example, found in the IPE mode 21.

FIG. 2 illustrates the various operations performed within an IPE node 201 within the scope of the example embodiment of the invention described below.

The incoming feed of IP datagrams (or packets) is processed by encapsulation means, which encapsulates the incoming IP datagrams into blocks, called MPE sections. Each MPE section contains a header, an encapsulated IP datagram, and parity bits obtained by calculating a CRC ("Cyclic Redundancy Check") error-detection code on the IP datagram and the header. These encapsulation means correspond to the MPE module 202 in FIG. 2.

FIG. 3 illustrates the application of a first FEC encoding to a sequence of symbols (in the particular example embodiment of the invention described below, it is assumed that a symbol is a binary byte) corresponding to a set of multimedia data packets to be encoded. The input sequence of the channel encoder is arranged in the memory based on a logical matrix of D columns represented in FIG. 2 (D=191 for DVB-H or DVB/SH), replacing the logical matrix 101 with the bytes of the input sequence column by column, as depicted in FIG. 2. In what follows, the terms "matrix" or "logical matrix" refer to a logical arrangement of the data for the purposes of specific processing which does not in any way presuppose the arrangement of the data within a memory when the processing is actually implemented within a device. The data to be encoded are thereby organized logically in the memory according to a matrix 101 known as an ADT ("Application Data Table"). The number L of rows in the ADT logical matrix depends on the length of the input sequence (L=256, 512, 768 or 1024 for DVB-H or DVB-SH). The data of the ADT logical matrix 101 is encoded row by row, by calculating a vector of parity symbols for each row. One of the purposes of this matrix logical arrangement is the application of a block code to the data vectors formed by the rows of the ADT logical matrix 101. The rows may be encoded using any block coding method which is known in and of itself, such as using a Reed-Solomon or LDPC encoding method. Thus, to the ADT logical matrix, and logical matrix of parity bits, known as RSDT, is added, in which every row corresponds to a vector of parity symbols resulting from encoding, such as Reed-Solomon (C,D)-encoding, the corresponding row in the ADT logical matrix. The number of columns in the RSDT logical matrix 102 is equal to C–D (C=255 for DVB-H or DVB/SH). The rows in the RSDT logical matrix 102 are also known as inner FEC, because they protect the data of the ADT logical matrix 101 from transmission errors, with an error correction capacity for symbols (a symbol being, in this example, a byte) equal to T=(C–D)/2 (or 32 bytes for DVB-H or DVB-SH). The logical matrix combining the ADT 101 and RSDT 102 logical matrices is also called the MPE-FEC frame.

The first FEC encoding applied to the MPE sections at the output of the MPE module 202 is carried out within the FEC encoding module 203, and produces a sequence of MPE-FEC frames MPE-FEC$_k$ with the sequential index k.

FIG. 4 illustrates the application of a second FEC encoding applied to the MPE-FEC frames. In the illustrated example, the data of B consecutive MPE-FEC frames in the sequential order they are produced by the MPE-FEC encoding module 203 is saved with a logical arrangement illustrated in FIG. 5. B is preferentially chosen from the divisors of C. The data of B consecutive MPE-FEC frames is written in a block logical matrix whose dimensions are (2*B−1)*C/B columns, and B*L rows. The data in each MPE-FEC frame is written while maintaining the same logical matrix arrangement as in the block matrix, applying to the frame whose sequence is j a shift of L*j rows, and a shift of (C*j)/B columns, j being an integer from 0 to B−1. One of the objects of this logical matrix arrangement is the application of a block of code to the data vectors made up of the elements of the columns in the block logical matrix 303, which columns are themselves made up of columns of B consecutive MPE-FEC frames arranged into a logical matrix. The rows may be encoded using any block coding method which is known in and of itself, such as using a Reed-Solomon or LDPC encoding method. Thus, a logical matrix 304 of parity symbols (otherwise known as redundancy symbols) is added to the block logical matrix, in which each column corresponds to a vector of parity symbols resulting from encoding, for example Reed-Solomon-encoding ((2*B−1)*C/B+S*L, (2*B−1)*C/B), the corresponding column in the block logical matrix 303. The logical parity matrix 304, whose dimensions are S*L rows and (2*B−1)*C/B columns, may be considered a block logical matrix comprising 2*B−1 blocks whose dimensions are S*L rows and C/B columns. The block 304a whose dimensions are S*L rows and C/B columns corresponds to a submatrix comprising the encoding parity symbols of the columns of B consecutive MPE-FEC frames written in the block logical matrix 303. The columns of these blocks 304a are also known as outer FEC, because they protect against transmission errors occurring across multiple MPE-FEC frames. The data in these blocks may be arranged in S sub-blocks whose dimensions are L rows and C/B columns, so as to add to a frame MPE-FEC S sub-blocks carrying the parity symbols of the B immediately previous MPE-FEC frames and the B MPE-FEC frames preceding the immediately previous MPE-FEC frames. Instead of generating the logical matrix 304 of parity symbols, it is also possible to generate only the block 304a whose dimensions are S*L rows and C/B columns, by encoding symbols in the columns of B consecutive MPE-FEC frames written in the block logical matrix 303. FIG. 4 illustrates this FEC encoding mechanism with B=3 MPE-FEC frames MPE-FEC$_k$, MPE-FEC$_{k+1}$ and MPE-FEC$_{k+2}$. In this example, the integer C is chosen from among multiples of 3. The data of the three MPE-FEC frames MPE-FEC$_k$, MPE-FEC$_{k+1}$, and MPE-FEC$_{k+2}$ are written in the block logical matrix 303 while maintaining the same logical matrix arrangement previously described, according to the diagram explained above. The block logical matrix [O$_{1,k}$; O$_{2,k}$] results from encoding the vectors formed by the columns whose rank is 1+2*C/3 to C for the MPE-FEC frame MPE-FEC$_k$, whose rank is 1+C/3 to 2° C./3 for the MPE-FEC frame MPE-FEC$_{k+1}$, and whose rank is 1 to C/3 for the MPE-FEC frame MPE-FEC$_{k+2}$. The symbols of the submatrix O$_{1,k}$ and those of the submatrix O$_{2,k-1}$ are added to the MPE-FEC frame MPE-FEC$_{k+1}$, those of the submatrix O$_{1,k+1}$ and those of the submatrix O$_{2,k}$ are added to the MPE-FEC frame MPE-FEC$_{k+2}$, and so on. The MPE-FEC frames to which inter-MPE-FEC-frame redundancy sub-blocks O$_{1,k+j}$ and O$_{2,k+j-1}$ are added are called MPE-OFEC frames.

This second FEC encoding of the MPE-FEC frames produced by the first encoding is carried out within the encoding module 203 in FIG. 2.

The transmission of the signals by the multimedia content broadcast system 20 is carried out using a time-division multiplexing (TDM) scheme in bursts, with a burst being sent over a sending time slot. This burst data sending technique particularly makes it possible to save on the power consumption of the receiving devices, which may be mobile terminals whose battery is a critical resource which should be conserved as much as possible. The module TS 204 in FIG. 2 forms bursts based on the MPE-OFEC frames which it receives from the FEC encoding module 203.

Returning to FIG. 1, the bursts produced by the IPE module 21 are transmitted to the DVB modulator 22 to be formatted in order to be sent, potentially by means of the repeater 23, over the air interface to the user device 40.

FIG. 5, is a synoptic diagram of a user device implementing the present invention according to a particular embodiment described below.

The user device 400 depicted in FIG. 5 comprises means 402 for multiplexing/demultiplexing the signals received through the antenna means 401 of the broadcast network, and through the cellular radio communication network. The multiplexing/demultiplexing means 402 transmits the signals received from the broadcast network to broadcast network reception processing means 404, and transmits the signals received from the cellular radio communication network to cellular radio communication network sending/receiving processing means 403. The cellular radio communication network sending/receiving processing means 403 comprise radio processing means, as well as means for processing the baseband signal. The radio processing means perform all of the radio processing efforts (amplification, filtering, equalization, demodulation, etc.) on the signals received from the cellular radio communication network at the reception antenna (antenna means 401), and transmit a baseband-demodulated digital signal to the baseband processing means. The broadcast network reception processing means 404 comprise radio processing means 405 and means 406 for demodulating the broadcast signal. The radio processing means 405 perform all of the radio processing efforts on the bursts received from the broadcast network at the antenna means 401, and transmit to the demodulation means 406 received signals carrying the bursts. The demodulation means 406 transmit to the IP de-encapsulation means 407 bursts of data after demodulating the received signals carrying the bursts. The IP de-encapsulation means 407 are responsible for processing the layers 1 (physical layer) and 2 (data link layer), and comprise physical layer processing means 407a and data link layer processing means 407b. In what follows, the processing performed by the layer 2 is more particularly examined, and more specifically the processing performed by the channel decoding means 407c included within the data link layer processing means 407b, in cooperation with the memory 408.

The physical layer processing means 407a process the demodulated signals carrying the bursts received from the demodulation means in order to produce a sequence of MPE-OFEC frames. The MPE-OFEC frames received from the physical layer processing means 407a by the data link layer processing means 407b are recorded in memory 408 in order to be processed later by the channel decoding means 407c in order to determine whether or not they have been correctly received. If a MPE-OFEC frame is correctly received and a decoded MPE section was produced, the data of the MPE section carrying the multimedia content is transmitted to the means 409 for playing the multimedia content, such as by means of an internal data transmission bus, potentially by way of the memory 408. If the MPE-OFEC frame is not correctly received, it may potentially be retrieved either by ever-correction, which assigns it with the assistance of the redundancy errors carried by the following and/or preceding MPE-OFEC frames, within the correction capacity limits of the code that is used. Below, the lost data may be requested by means of a retransmission request triggered quickly enough for the multimedia content zo playing means 409 to be able to benefit from it. If this occurs, the retransmission request shall be sent by the cellular radio communication network sending/ receiving processing means 403, adding to it an identifier of the data to be resent, such as an MPE-OFEC frame's sequence number.

In some situations, it will be possible to recover the lost data, using the "outer-FEC" redundancy information, even when they might correspond to multiple consecutive MPE-OFEC frames, provided that the quantity of data that was lost does not exceed the correction capacity of the error-correction code used for the FEC encoding of the MPE-FEC frames. Whenever the loss of an MPE-OFEC frame is detected by the means 407c, the sequence number of the lost frame is recorded in memory, and the means 407b trigger a monitoring effort intended to react as quickly as possible to the loss of a number of consecutive MPE-OFEC frames great enough to exceed or come close to exceeding the correction capacities of the error-correction code used for encoding the MPE-FEC frames, by sending a request to retransmit the lost frame(s).

FIG. 6 is an example algorithm for implementing the invention according to a particular embodiment, which may be implemented within the data link layer processing means 407b described previously, in cooperation with the memory 408.

The algorithm depicted in FIG. 6 comprises a first step of initializing a compt counter. This step of initialization is followed by a step of detection in order to determine whether the MPE-OFEC$_k$ frame currently being processed was or was not correctly received. If the MPE-OFEC$_k$ frame currently being processed was correctly received, the algorithm loops to return to the previous step of reinitializing the compt counter. If it is determined that the MPE-OFEC$_k$ frame currently being processed was not correctly received, the algorithm determines whether the previous MPE-OFEC$_{k-1}$ frame had not itself also been correctly received. If the previous frame MPE-OFEC$_{k-1}$ had been correctly received, it is saved in memory 408, such as by assigning to a variable J an index value identifying the position of the MPE-OFEC$_k$ frame currently being processed in the sequence (the index referred to as k in FIG. 6), before incrementing the compt counter. Otherwise, if the previous MPE-OFEC$_{k-1}$ frame had not been correctly received, the compt counter is incremented directly. Next, the value of the compt counter is compared to a predetermined threshold which is equal, in the example depicted in FIG. 6, to $$B \times \frac{1-T}{T},$$

where T refers to the coding rate of the "outer FEC" encoding of the MPE-FEC frames, and B refers to the number of MPE-FEC frames to which the "outer FEC" encoding is applied. In the example in FIG. 4, the coding rate of the "outer FEC" encoding is ⅔, given that 2 redundancy blocks O$_{1,k}$ and O$_{2,k}$ whose size is L rows and C/3 columns are generated by encoding 3 blocks of data whose size is L rows and C/3 columns, respectively coming from the 3 MPE-FED frames MPE-FEC$_k$, MPE-FEC$_{k+1}$, and MPE-FEC$_{k+2}$. In this case, the threshold shown in FIG. 6 is equal to B/2. If the value of the compt counter is greater than this threshold, a request to retransmit the MPE-OFEC frame whose index corresponds to the value previous recorded in memory is generated (with the abbreviations in the previous example, the current value of the variable J). The step of sending a retransmission request is followed by a step of decrementing the compt counter, and of incrementing the index value of the MPE-OFEC frame previously recorded in memory (with the notations of the previous example, the value k+1 is assigned to the variable J). The index value of the frame currently being processed is then incremented, and the processing of the following segment is requested, followed by looping back to the previously described step of detection afterward. If the value of the compt counter is not greater than the threshold, the value of the index identifying the position of the MPE-OFEC frame currently being processed is incremented, and the processing at reception of a new frame requested for the index frame is that of the MPE-OFEC frame currently being processed plus 1 point, followed by finally looping back to the previously described step of detecting the loss of the MPE-OFEC frame.

It should be noted that a threshold value less than $$B \times \frac{1-T}{T}$$

may be chosen, such as $$B \times \frac{1-T}{T} - 1,$$

in order to ensure an even faster triggering of the retransmission request.

The invention claimed is:

1. A method for transmitting data from a radio communication network infrastructure to user devices, said data being carried by a sequence of frames broadcast to the user devices, each frame comprising a first section comprising data and a second section comprising redundancy information associated with the data of a predetermined number B of previous frames in the sequence, which method comprises, relative to a user device:

comparing a number of consecutive lost frames to a threshold dependent on the number B of previous frames with which said redundancy information is associated and on the coding rate of an encoding upon which generation of the redundancy information is based, wherein said threshold is chosen to be equal to:

$$B \times \frac{1-T}{T},$$

where T refers to the coding rate of the encoding upon which the generation of said redundancy information is based; and, sending a request to retransmit at least one of the consecutive lost frames to the radio communication network infrastructure if the number of consecutive lost frames exceeds said threshold.

2. A method according to claim 1, further comprising sending a request to retransmit the first lost frame in the sequence of consecutive lost frames to the radio communication network infrastructure if the number of consecutive lost frames exceeds the threshold.

3. A method according to claim 1, wherein the redundancy information associated with the data of a predetermined number B of previous frames in the sequence is obtained by encoding the first sections of the B previous frames in the sequence into data blocks.

4. A method according to claim 1, wherein the radio communication network infrastructure comprises a multimedia content broadcast network infrastructure and a cellular radio communication network infrastructure, and the user devices are capable of receiving content broadcast by the multimedia content broadcast network infrastructure and of communicating with the cellular radio communication network infrastructure, the frames carrying the data being broadcast to the user devices by the multimedia content broadcast network infrastructure, and the request to retransmit at least one of the consecutive lost frames being sent to the cellular radio communication network infrastructure.

5. A method according to claim 4, wherein the multimedia content broadcast network infrastructure is DVB-H or DVB-SH, and the cellular radio communication network infrastructure is UMTS, LTE or WiMAX.

6. A method according to claim 1 implemented in a computer program, which may be loaded into a memory associated with a processor, and comprising instructions for implementing the method when said program is executed by the processor.

7. A method according to claim 6 wherein the program is recorded on a non-transitory computer readable storage medium.

8. A radio, configured to communicate with a cellular radio communication network infrastructure transmitting data to user devices, the data being carried by a sequence of frames broadcast to the user devices, each frame comprising a first section comprising data and a second section comprising redundancy information associated with the data of a predetermined number B of previous frames in the sequence, which radio includes:

a receiver operative to receive consecutive frames in a sequence; a decoder operative to determine the loss of consecutive frames in the sequence;

a processor operative to compare the number of consecutive lost frames in the sequence with a threshold dependent on the number B of previous frames with which the redundancy information is associated and on a coding rate of an encoding upon which generation of the redundancy information is based, wherein the threshold is chosen to be equal to:

$$B \times \frac{1-T}{T},$$

where T refers to the coding rate of the encoding upon which generation of the redundancy information is based; and a transmitter operative to send a request to retransmit at least one of the consecutive lost frames to the radio communication network infrastructure if the number of consecutive lost frames exceeds said threshold.

9. A device according to claim 8, further operative to send a request to retransmit the first lost frame in the sequence of consecutive lost frames to the radio communication network infrastructure if the number of consecutive lost frames exceeds the threshold.

10. A device according to claim 8, further operative to receive multimedia content broadcast by a multimedia content broadcast network infrastructure and communicate with a cellular radio communication network infrastructure, the device being adapted to receive and decode frames carrying data broadcast to the user devices by the multimedia content broadcast network infrastructure, and the device also being adapted to send the retransmission request to the cellular radio communication network infrastructure.

11. A device according to claim 10, further operative to receive multimedia content broadcast by a DVB-H or DVB-SH multimedia content broadcast network infrastructure, and communicate with a cellular radio communication network infrastructure may be UMTS, LTE or WiMAX.

12. A device according to claim 8 implemented in a radio communication mobile station.

* * * * *

UNITED STATES PATENT AND TRADEMARK OFFICE
CERTIFICATE OF CORRECTION

PATENT NO. : 8,537,749 B2  Page 1 of 1
APPLICATION NO. : 12/678369
DATED : September 17, 2013
INVENTOR(S) : Sayadi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this
Fifteenth Day of September, 2015

Michelle K. Lee
*Director of the United States Patent and Trademark Office*